US 12,494,122 B2

United States Patent
Plechinger et al.

(10) Patent No.: US 12,494,122 B2
(45) Date of Patent: Dec. 9, 2025

(54) METHOD FOR PREDICTING THE BEHAVIOR OF A TARGET VEHICLE

(71) Applicant: AUDI AG, Ingolstadt (DE)

(72) Inventors: Jörg Plechinger, Munich (DE); Thorsten Hehn, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 714 days.

(21) Appl. No.: 17/766,949

(22) PCT Filed: Oct. 8, 2020

(86) PCT No.: PCT/EP2020/078204
§ 371 (c)(1),
(2) Date: Apr. 6, 2022

(87) PCT Pub. No.: WO2021/069541
PCT Pub. Date: Apr. 15, 2021

(65) Prior Publication Data
US 2023/0049721 A1 Feb. 16, 2023

(30) Foreign Application Priority Data
Oct. 11, 2019 (DE) ...................... 10 2019 215 680.0

(51) Int. Cl.
G08G 1/0965 (2006.01)
G08G 1/01 (2006.01)
(Continued)

(52) U.S. Cl.
CPC ......... *G08G 1/0965* (2013.01); *G08G 1/0112* (2013.01); *G08G 1/052* (2013.01); *G08G 1/056* (2013.01)

(58) Field of Classification Search
CPC .... G08G 1/0965; G08G 1/0112; G08G 1/052; G08G 1/056
See application file for complete search history.

(56) References Cited

U.S. PATENT DOCUMENTS 8,229,663 B2   7/2012  Zeng et al.
9,495,874 B1  11/2016  Zhu et al.
(Continued)

FOREIGN PATENT DOCUMENTS

DE   102010006084 A1   10/2010
DE   102013005362 A1   10/2013
(Continued)

OTHER PUBLICATIONS

Bastola, Anomaly Detection in Cooperative Vehicle Perception Systems Under Imperfect Communication (Year: 2025).*
(Continued)

*Primary Examiner* — Jelani A Smith
*Assistant Examiner* — Gabriel Anfinrud
(74) *Attorney, Agent, or Firm* — Sterne, Kessler, Goldstein & Fox P.L.L.C.

(57) ABSTRACT

The present disclosure relates to a method for predicting a behavior of a target vehicle in a maneuvering space, in which a plurality of maneuvers which can be executed in the future are provided for the target vehicle, in the maneuvering space, the target vehicle located in the maneuvering space being observed by a plurality of observation vehicles, for each maneuver of the target vehicle that can be executed in the future, a single probability distribution for the relevant maneuver that can be executed in the future being determined, on the basis of an observation performed by a relevant observation vehicle, for each maneuver of the target vehicle that can be executed in the future, a total probability distribution for the relevant maneuver of the target vehicle that can be executed in the future being established from a plurality of single probability distributions.

12 Claims, 1 Drawing Sheet

(51) Int. Cl.
　　　*G08G 1/052*　　　(2006.01)
　　　*G08G 1/056*　　　(2006.01)

(56) References Cited

U.S. PATENT DOCUMENTS

| | | | |
|---|---|---|---|
| 9,934,688 | B2 | 4/2018 | Olson et al. |
| 10,095,238 | B2 | 10/2018 | Miller et al. |
| 10,239,529 | B2 | 3/2019 | Filev et al. |
| 2013/0278440 | A1 | 10/2013 | Rubin et al. |
| 2016/0357188 | A1* | 12/2016 | Ansari ............... G05D 1/0274 |
| 2019/0051179 | A1 | 2/2019 | Alvarez et al. |
| 2019/0088135 | A1 | 3/2019 | Do et al. |
| 2019/0165946 | A1* | 5/2019 | Unagami ............ H04W 12/106 |
| 2020/0133307 | A1* | 4/2020 | Kelkar ..................... G08G 1/22 |
| 2021/0012658 | A1* | 1/2021 | Avedisov ......... G08G 1/096708 |
| 2022/0060928 | A1* | 2/2022 | Jung ................. B60W 50/0097 |

FOREIGN PATENT DOCUMENTS

| | | |
|---|---|---|
| DE | 102016113903 A1 | 3/2017 |
| DE | 102017102605 A1 | 9/2017 |
| DE | 102016106983 A1 | 10/2017 |
| DE | 102017129501 A1 | 6/2018 |
| EP | 2096612 B1 | 9/2009 |
| EP | 2615598 A1 | 7/2013 |
| EP | 2957462 A1 | 12/2015 |
| WO | WO 2019/138485 A1 | 7/2019 |

OTHER PUBLICATIONS

Cai, Consensus-Based Distributed Cooperative Perception for Connected and Automated Vehicles (Year: 2023).*
Cui, Cooperative Perception Technology of Autonomous Driving in the Internet of Vehicles Environment: A Review (Year: 2022).*
International Search Report and Written Opinion of the International Searching Authority directed to related International Patent Application No. PCT/EP2020/078204, mailed Jan. 28, 2021 with attached English-language translation; 19 pages.
Braeuchle, Christian et al., "Situation Analysis and Decision Making for Active Pedestrian Protection using Bayesian Networks," Proceedings of 6. Tagung Fahrerassistenz; Available at: https://mediatum.ub.tum.de/doc/1187195/1187195.pdf; downloaded Mar. 30, 2022; 5 pages.
Dagli, Ismail et al., "Action Recognition and Prediction for Driver Assistance Systems using Dynamic Belief Networks," Lecture Notes in Comp. Sci. 2592, Mar. 2003; Available at: .https://www.researchgate.net; downloaded Mar. 30, 2022; pp. 179-194; 15 pages.
International Preliminary Report on Patentability directed to related International Patent Application No. PCT/EP2020/078204, completed Mar. 1, 2022, with attached English-language translation; 11 pages.

* cited by examiner

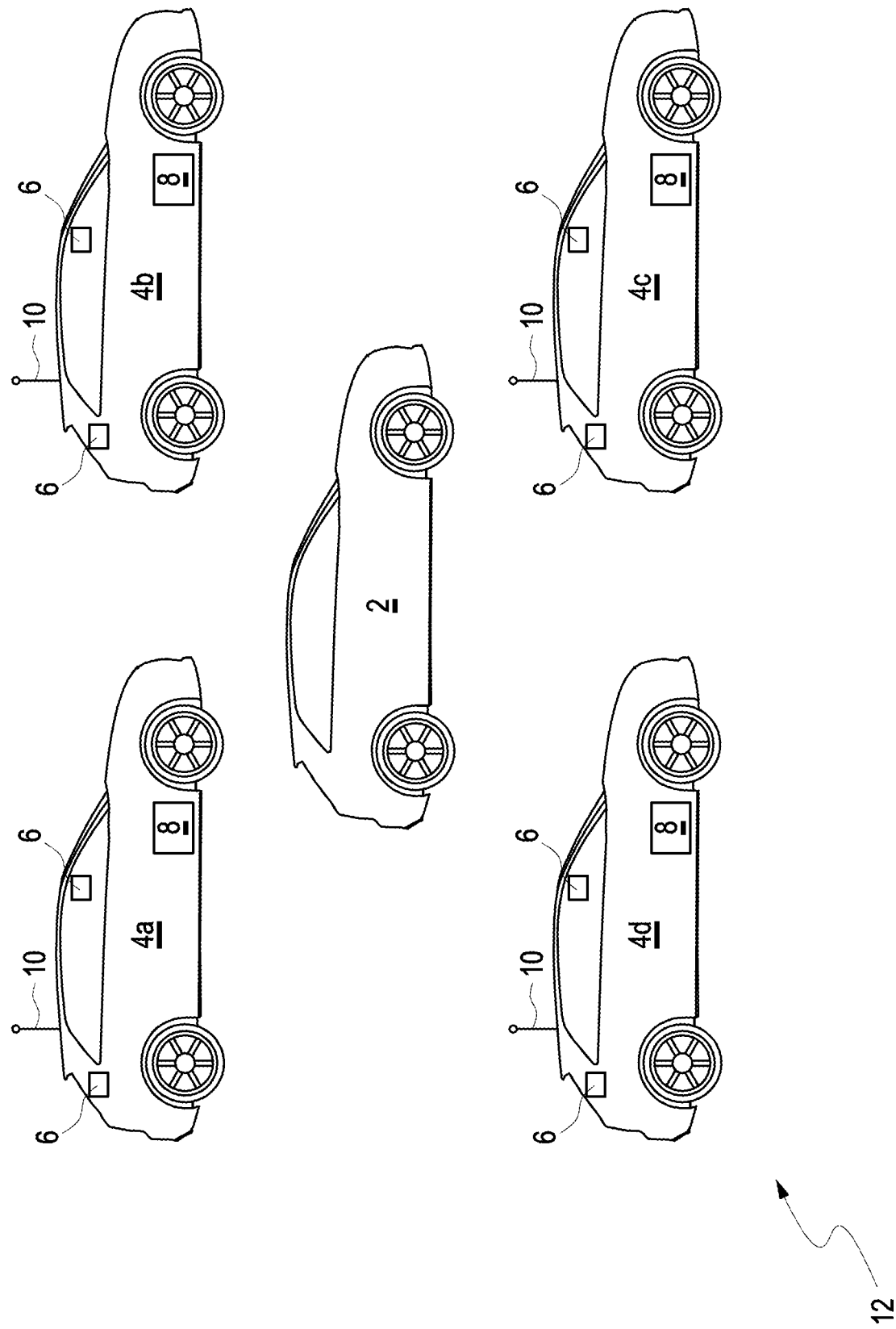

METHOD FOR PREDICTING THE BEHAVIOR OF A TARGET VEHICLE

TECHNICAL FIELD

The present disclosure relates to a method and a system for predicting a behavior of a target vehicle.

BACKGROUND

It is possible, in principle, for a vehicle located in road traffic to be recorded by sensors of another vehicle, and for its behavior to be analyzed on the basis thereof.

The document EP 2 096 612 B1 describes a system and a computer program for creating a route control plan.

A method for controlling a light distribution of a headlight of a vehicle is known from the document EP 2 957 462 A1.

The document WO 2019/138485 A1 describes a method for predicting a collision.

The document US 2016/0357188 A1 describes a measure for operating an intelligent vehicle, a 3D model of a field of view of a sensor of the vehicle being created. Furthermore, information is received from neighboring vehicles, in order to compensate a total angle in the field of view of the sensor and of the driver of the intelligent vehicle. Furthermore, traffic information is received, and a plurality of 3D models are adjusted on the basis of received traffic information and information relating to the total angle. The plurality of 3D models is aggregated in order to create a comprehensive 3D model which is combined with detailed map information.

Against this background, an object was that of predicting a behavior of a vehicle in road traffic.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 1 schematically shows an embodiment of the system when performing an embodiment of the method according to the present disclosure.

DETAILED DESCRIPTION

The object is achieved by a method and a system having the features of the independent claims. Embodiments of the method and of the system follow from the dependent claims and the description.

The method according to an embodiment is intended for predicting a behavior of a target vehicle, designed for example as a motor vehicle, in a maneuvering space, for example in road traffic. In this case, a plurality of maneuvers which can be executed in the future are provided and/or taken into account for the target vehicle, in the maneuvering space, the target vehicle located in the maneuvering space being observed by a plurality of observation vehicles, for example further motor vehicles, for each maneuver of the target vehicle that can be executed in the future, a single probability distribution for the maneuver that can be executed in the future being determined and/or established in each case, on the basis of an observation performed by the relevant observation vehicle. Furthermore, for each maneuver of the target vehicle that can be executed in the future, a total probability distribution for the relevant maneuver of the target vehicle that can be executed in the future is determined and/or established from a plurality, in particular all, of the single probability distributions.

In an embodiment, the target vehicle is observed by i observation vehicles, m maneuvers that are predictable and/or are to be predicted being provided and/or taken into account for the target vehicle, a total probability distribution Pr (M=Mn|Observation 1, . . . , Observation i) being established for an nth maneuver in each case, where $1 \leq n \leq m$, which distribution is based on i observations.

In this case, it is possible for a jth total probability distribution Pr (M=Mn|Observation j) for the nth maneuver to be established by a jth observation vehicle on account of a jth Observation j of the target vehicle, where $1 \leq j \leq i$, and to be transmitted to a further j+1th observation vehicle, from which a j+1th total probability distribution Pr (M=Mn|Observation j, Observation j+1) is established for the nth maneuver, taking into account a j+1th Observation j+1 of the target vehicle.

It is thus possible for the total probability distribution for the nth maneuver to be determined iteratively from a plurality of, for example i, observations by different observation vehicles, said total probability distribution for the nth maneuver being more accurate, the more there are observations performed by different observation vehicles.

Depending on the definition, for the nth maneuver a j+1th total probability distribution (j+1) can result from a jth total probability distribution (j) in combination with a j+1th single probability distribution (j+1).

In addition, for every observation performed, which has already been determined by a relevant observation vehicle and has been taken into account for the total probability distribution, a hash value is provided and/or generated, which indicates that said observation has already been taken into account for the total probability distribution.

The target vehicle is observed by the observation vehicles from different perspectives.

The method can be carried out by at least one automatically or manually controlled observation vehicle, typically by a plurality of automatically or manually controlled observation vehicles, for a manually or automatically controlled target vehicle.

In the method, a direction or journey of the target vehicle and/or a speed, for example also a change of speed, and thus an acceleration of the target vehicle, can be taken into account as at least one maneuver, travel forwards, for example straight ahead, travel to the left, travel to the right, and/or travel backwards being taken into account for a relevant maneuver, and maintenance of a constant speed, the acceleration and/or braking, optionally a standstill, being taken into account for the relevant maneuver.

It is furthermore possible for example for m maneuvers, provided and/or taken into account or to be taken into account, to be selected from a larger number of possible maneuvers, the behavior of the target vehicle being predicted only on the basis of selected, for example relevant, maneuvers.

The system according to an embodiment is designed for predicting a behavior of a target vehicle in a maneuvering space, and comprises sensors which are arranged in a plurality of observation vehicles, and at least one arithmetic unit which is arranged in at least one observation vehicle. In general, at least one sensor for recording surroundings of the observation vehicle is arranged in each observation vehicle. Furthermore, each observation vehicle may comprise an arithmetic unit. A plurality of maneuvers that can be executed in the future are provided for the target vehicle, in the maneuvering space, in each case at least one sensor of each observation vehicle being designed to observe the target vehicle located in the maneuvering space. The at least one arithmetic unit is designed, for each maneuver of the target vehicle that can be executed in the future, to determine and/or establish, on the basis of an observation performed by the at least one sensor of the relevant observation vehicle, a single probability distribution for the relevant maneuver that can be executed in the future, and furthermore to determine and/or establish, from a plurality of, in particular from all of, the single probability distributions, a total probability distribution for the relevant maneuver of the target vehicle that can be executed in the future.

Each observation vehicle can comprise at least one sensor which is designed for receiving electromagnetic waves. In this case, it is possible for at least one sensor to be designed as an optical sensor, for example as a camera. Alternatively or in addition, it is possible for at least one sensor to be designed as a radar sensor, an infrared sensor, or a lidar sensor. A sensor of this kind can also be designed as an ultrasound sensor. It is possible for a relevant observation vehicle to comprise a plurality of sensors for recording the surroundings, it being possible for said sensors to be designed so as to be the same or different. In an embodiment of the proposed method with an embodiment of the proposed system it is now possible for observations of the target vehicle to be performed, from different perspectives, by the sensors which are arranged on the observation vehicles. Said individual observations, performed in a sensory manner, are evaluated by the at least one arithmetic unit. In this case, it is possible for a single probability for a relevant maneuver to be established on the basis of one observation, in each case.

Furthermore, every observation vehicle involved in the method comprises a communication device for transmitting and receiving a sensorially established observation, a respective single probability distribution on the basis of a respective observation, and/or the iteratively provided total probability distribution.

Typically, every observation vehicle comprises an arithmetic unit which is designed to establish a single probability for a relevant maneuver, on the basis of the relevant observation of the target vehicle. Furthermore, each arithmetic unit can be designed to establish not only the relevant single probability distribution, but rather also a jth total probability distribution, taking into account a j−1th total probability distribution, which is provided by one of the other observation vehicles, and taking into account a jth single probability distribution. If only some of all the observation vehicles comprises a relevant arithmetic unit for determining a single probability distribution and/or a total probability distribution, it is possible for individual observations to be transferred from observation vehicles without arithmetic units to a relevant observation vehicle comprising an arithmetic unit, said arithmetic unit being designed to establish the total probability distribution taking into account different observations from different observation vehicles.

Irrespective of now the total probability distribution is calculated from different observations and/or single probabilities within the context of the method, it is possible, overall, for cooperative maneuver prediction to be performed, for the target vehicle, by a plurality of observation vehicles. The total probability distribution, at least one single probability distribution, and/or at least one individual observation is/are exchanged between the vehicles via signals which are transported by means of electromagnetic waves. For the purpose of radio-based exchange of the signals, a C2X (car-to-everything) or V2X (vehicle-to-everything) functionality is used, which allows for an exchange of signals among individual vehicles, in this case from the observation vehicles, but also between vehicles and other devices.

In an embodiment, it is possible for the observation vehicles to travel automatically. It is furthermore possible that the observation vehicles can better predict the behavior of the target vehicle together, as further road users, than a single vehicle would be able to. A maneuver to be predicted is thus determined not by a single observation vehicle but rather by a plurality of, in particular all of the, observation vehicles, in surroundings of the target vehicle. In this case, it is taken into account that each individual observation vehicle can in each case contribute at least one independent distorted observation for the maneuver to be predicted, to the total probability distribution to be established, using its at least one sensor and/or its arithmetic unit. In this case, all the observations of the observation vehicles may be distorted, distortions of the observations occurring independently of one another. In this case, it is possible for a relevant observation to be based on at least one recording, typically a plurality of recordings, which are recorded by one sensor, in each case, which is designed as a camera. In this case, recordings by different sensors are recorded from different viewing angles and/or perspectives.

In an embodiment, the individual observations and/or single probability distributions of all the observation vehicles can be collected and merged by means of the V2X communication, for example V2V (vehicle-to-vehicle), among the individual observation vehicles, a prediction of the relevant maneuver being improved. It is furthermore possible to transmit an improved prediction of this kind, of the relevant maneuver, via V2X communication, to further vehicles that are manually controlled and thus not self-driving, and thus share the total probability distribution for a relevant maneuver with other manually controlled vehicles. On the basis of the total probability distribution, warning messages can then be provided, or other protective measures carried out, in an autonomous, partially autonomous, or driver-assisted manner, in a relevant vehicle.

In an embodiment, the proposed method can be carried out in a manner similar to a belief propagation approach. In this case it is possible for at least one observation vehicle to send a notification or message to at least one other observation vehicle, via the V2X communication, for cooperative prediction of a maneuver of the target vehicle. This notification comprises information relating to the maneuvering space, for example an arrangement and spread of the maneuvering space in the spatial domain, and a list of all the maneuvers, executable or possible in the maneuvering space, which can be implemented by the target vehicle. Furthermore, each observation vehicle specifically establishes a single probability distribution for each possible maneuver in the maneuvering space, each single probability distribution being based at least on one observation, in which the target vehicle was recorded by the observation vehicle. Furthermore, hash values can be established for the observations, which values have already been taken into account for calculating the total probability distribution.

In the field of automatic driving or traffic it is necessary for self-driving vehicles, in particular self-driving observation vehicles, to be able to perform well even in mixed traffic, in which manually controlled vehicles may also travel. Within the context of the method, it is possible to distinguish between self-driving vehicles, for example observation vehicles, and manually driven or controlled vehicles, for example target vehicles, by means of classification of the vehicles. In this case, it is possible, taking into account observations of a plurality of, in particular all, the observation vehicles, to establish a total probability of a maneuver, which can be executed in each case, for each manually driven vehicle. It is furthermore provided that a method for belief propagation be used within the scope of signal processing for radio systems for virtually optimal decoding for channel coding methods. In this case, an assumption of an outcome of a random experiment among different parties is processed iteratively, and thus an assumption is improved. The proposed method can be based on belief propagation, it being possible for a cooperative prediction of maneuvers of the target vehicle to be established from a plurality of, in particular all, observation vehicles. Belief propagation is described in the article "Low Density Parity Check Codes" by Rajesh Poddar (ELE539B Spring 2007 Midterm Paper).

Further advantages and embodiments of the present disclosure can be found in the description and the accompanying drawings.

Of course, the features which are mentioned above and will be explained further in the following are applicable not only in the combination specified in each case, but rather also in other combinations or in isolation, without departing from the scope of the present disclosure.

The present disclosure is shown schematically in the drawings, on the basis of embodiments, and is described schematically and in detail with reference to the drawings.

FIG. 1 schematically shows an embodiment of the system when performing an embodiment of the method according to the present disclosure.

FIG. 1 schematically shows a motor vehicle, designed in this case as the target vehicle 2, which is located or moves in a maneuvering space, in this case in road traffic including further motor vehicles, which are designed in this case as observation vehicles 4a, 4b, 4c, 4d. In this case, each observation vehicle 4a, 4b, 4c, 4d in each case comprises a plurality of sensors 6 for observing and/or recording surroundings of the relevant observation vehicle 4a, 4b, 4c, 4d. Furthermore, each observation vehicle 4a, 4b, 4c, 4d comprises an arithmetic unit 8 and a communication device 10, of which only one antenna is shown here, a relevant communication device 10 being designed for performing V2X (vehicle-to-everything) communication, at least V2V communication, among individual observation vehicles 4a, 4b, 4c, 4d In this case it is provided, here, that the proposed sensors 6, arithmetic units 8 and communication devices 10, which are distributed over a plurality of observation vehicles 4a, 4b, 4c, 4d, can, depending on the definition, also be designed as components of the embodiment of the system 10 according to the embodiment.

In the case of the embodiment of the method according to the embodiment proposed here, it is possible to predict a behavior of the target vehicle 2 in the maneuvering space. In this case, it is possible that the target vehicle 2 can execute different maneuvers, in the maneuvering space, which can be defined for example by changing a direction of the target vehicle 2, for example by traveling straight or steering towards the left or right, and/or by changing a speed of the target vehicle 2, for example by accelerations or braking.

In the embodiment of the method, at a point in time a first observation (Observation 1) is made by at least one sensor 6 of the first observation vehicle 4a, from a first perspective. Furthermore, a second observation (Observation 2) of the target vehicle 2 is made by at least one sensor 6 of the second observation vehicle 4b, from a second perspective. In each case independently thereof, one of the two further observation vehicles 4c, 4d, in each case, also makes a third observation (Observation 3) and a fourth observation (Observation 4), from a respective perspective from which at least one sensor 6 of the relevant observation vehicle 4c, 4d can record the target vehicle 2.

It is furthermore proposed, here, to select and/or take into account, for the target vehicle 2 in the maneuvering space, in this case four different maneuvers M1, M2, M3, M4 from a possibly larger number of possible maneuvers M1, M2, M3, M4, M5, M6, etc., a cooperative total probability distribution being provided for each of said selected maneuvers M1, M2, M3, M4 on the basis of observations (Observation 1, Observation 2, Observation 3, Observation 4) of all the observation vehicles 4a, 4b, 4c, 4d, taking into account the different perspectives of the observation vehicles 4a, 4b, 4c, 4d relative to the target vehicle 2.

In this case, overall n=4 maneuvers are to be taken into account, a total of i=4 observations being made for the target vehicle 2. In this case, a jth observation (Observation j) is performed by a jth observation vehicle 4a, 4b, 4c, 4d, where $1<=j<=i$ with i=4 applies. In this case, a respective jth observation is provided and/or recorded by the at least one sensor 6 of the jth observation vehicle 4a, 4b, 4c, 4d. On the basis of each jth observation, the arithmetic unit 8 of the relevant jth observation vehicle 4a, 4b, 4c, 4d determines and/or establishes, for example calculates, a single probability distribution for each of the overall n=4 maneuvers. Thus, for a respective nth maneuver, a single probability distribution Pr (M=Mn|Observation j) is established and/or determined on the basis of a jth observation of the jth observation vehicle 4a, 4b, 4c, 4d, from which single probability distribution a total probability distribution Pr (M=Observation j, . . . ) is established on the basis of a plurality of Observations j and/or single probability distributions Pr (M=Mn|Observation j). Furthermore, a hash value hash Observation j is also provided for each jth observation, Observation j.

In the embodiment of the method set out here, the first observation vehicle 4a sends the following information, depending on the definition total probability distributions or single probability distributions Pr (M=Mn|Observation 1), for which n=4 possible maneuvers, which are based on a first Observation 1 of the first observation vehicle, to at least one of the further observation vehicles 4b, 4c, 4d:

Transmitted information of the first observation vehicle 4a:

Maneuvering space: M1, M2, M3, M4
    Pr (M=M1|Observation 1);
    Pr (M=M2|Observation 1);
    Pr (M=M3|Observation 1);
    Pr (M=M4|Observation 1);
    hash Observation 1;

If the second observation vehicle 4b receives a message comprising this information of the first observation vehicle 4a, and can contribute a further, in this case second, Observation 2, it calculates new total probability distributions taking into account the previous first Observation 1 and its own new, second Observation 2. It then transmits the following information:

Pr (M=M1|Observation 1, Observation 2);
    Pr (M=M2|Observation 1, Observation 2);
    Pr (M=M3|Observation 1, Observation 2);
    Pr (M=M4|Observation 1, Observation 2);
    hash Observation 1, hash Observation 2;

If the third observation vehicle 4c receives this information and can contribute a third Observation 3, it calculates new total probability distributions for the four maneuvers, taking into account the previous observations, Observation 1, Observation 2, and its own new, third Observation 3. It then sends the following information:

Pr (M=M1|Observation 1, Observation 2, Observation 3);
Pr (M=M2|Observation 1, Observation 2, Observation 3);
Pr (M=M3|Observation 1, Observation 2, Observation 3);
Pr (M=M4|Observation 1, Observation 2, Observation 3);
hash Observation 1, hash Observation 2, hash Observation 3;

An iterative development of a respective total probability distribution for a respective one of the total of four maneuvers is possible by repeated application of Bayes' theorem.

The fourth observation vehicle 4d, which receives the information containing the message of the third observation vehicle 4c, can then include for example its fourth Observation 4 in the total probability distribution.

Pr (M=M1|Observation 1, Observation 2, Observation 3, Observation 4);
Pr (M=M2|Observation 1, Observation 2, Observation 3, Observation 4);
Pr (M=M3|Observation 1, Observation 2, Observation 3, Observation 4);
Pr (M=M4|Observation 1, Observation 2, Observation 3, Observation 4);
hash Observation 1, hash Observation 2, hash Observation 3, hash Observation 4;

Adding further observations improves the quality of the total probability distribution, and thus the quality of the prediction.

The hash values hash Observation 1, hash Observation 2, hash Observation 3, hash Observation 4 ensure that one observation is not included multiple times in the calculation. Thus, in the example show, it is ensured that for example the third observation vehicle 4c involved does not again include Observation 1 and Observation 2.

LIST OF REFERENCE SIGNS 2 target vehicle
4a, 4b, 4c, 4d observation vehicle
6 sensor
8 arithmetic unit
10 communication device
12 system

The invention claimed is:

1. A method for predicting a behavior of a target vehicle in a maneuvering space comprising:
receiving by a plurality of observation vehicles, a plurality of maneuvers, which can be executed in the future, for the target vehicle in the maneuvering space;
performing an observation of the target vehicle located in the maneuvering space by at least one sensor on each of the plurality of observation vehicles, to determine a set of possible maneuvers from the plurality of maneuvers, wherein each maneuver of the set of possible maneuvers of the target vehicle can be executed in the future;
determining using an arithmetic unit of each of the plurality of observation vehicles, a plurality of single probability distributions for the set of possible maneuvers that can be executed in the future based on the observation carried out by each observation vehicle;
sharing, via vehicle-to-everything (V2X) communication in real time, individual distributions of the plurality of single probability distributions determined by each of the plurality of observation vehicles with each other;
determining a total probability distribution for the set of possible maneuvers of the target vehicle established from the plurality of single probability distributions;
sharing the total probability distribution for the set of possible maneuvers with further, manually controlled vehicles; and
providing warning messages, to the further manually controlled vehicle in each case, on a basis of the total probability distribution.

2. The method according to claim 1, further comprising:
determining, by a jth observation vehicle, on a basis of a jth Observation_j of the target vehicle, where $1<=j<=i$, a jth single probability distribution Pr (M=Mn|Observation_j) for an nth maneuver; and
transmitting this to a further j+1 th observation vehicle (4a, 4b, 4c, 4d) which determines a j+1 th total probability distribution Pr (M=Mn| Observation_j, Observation_j+1) for the nth maneuver, taking into account a j+1 th Observation_j+1 of the target vehicle.

3. The method according to claim 1, further comprising:
providing a hash value, wherein, for every observation performed, which has already been determined by an observation vehicle of the plurality of observation vehicles and has been taken into account for the total probability distribution, the hash value indicating that said observation has already been taken into account for the total probability distribution.

4. The method according to claim 1, wherein the target vehicle is observed by the plurality of observation vehicles from different perspectives.

5. The method according to claim 1, which is performed by at least one automatically controlled observation vehicle for a manually controlled target vehicle.

6. The method according to claim 1, wherein a direction of travel of the target vehicle or a speed of the target vehicle is taken into account as at least one maneuver.

7. The method according to claim 1, wherein determining the set of possible maneuvers from the plurality of maneuvers comprises selecting the set of possible maneuvers from the plurality of maneuvers.

8. The method according to claim 1, wherein determining the total probability distribution comprises:
collecting individual single probability distributions of the plurality of observation vehicles; and
merging the individual single probability distributions using the V2X communication among the plurality of observation vehicles.

9. The method according to claim 8, further comprising transmitting a prediction of a relevant maneuver, via the V2X communication, to further vehicles that are manually controlled.

10. A system for predicting a behavior of a target vehicle in a maneuvering space, the system comprising:
sensors which are arranged in a plurality of observation vehicles, wherein at least one sensor of each observation vehicle is configured to observe the target vehicle located in the maneuvering space, wherein a plurality of maneuvers that can be executed in the future being provided for the target vehicle; and
at least one arithmetic unit which is arranged in at least one observation vehicle of the plurality of observation vehicles, wherein the at least one arithmetic unit is configured to:
perform an observation of the target vehicle located in the maneuvering space by the at least one sensor on each of the plurality of observation vehicles, to determine a set of possible maneuvers from the plurality of maneuvers, wherein each maneuver of the set of possible maneuvers of the target vehicle can be executed in the future;

for at least each maneuver of the set of possible maneuvers of the target vehicle that can be executed in the future, determining, on a basis of an observation performed by the at least one sensor of a relevant observation vehicle, a plurality of single probability distributions for the set of possible maneuvers that can be executed in the future based on the observation carried out by each observation vehicle;

sharing, via vehicle-to-everything (V2X) communication in real time, individual distributions of the plurality of single probability distributions determined by each of the plurality of observation vehicles with each other;

determining a total probability distribution for the set of possible maneuvers of the target vehicle established from the plurality of single probability distributions;

sharing the total probability distribution for a relevant maneuver being intended with further, manually controlled vehicles, and providing warning messages to the further manually controlled vehicle on a basis of the total probability distribution.

11. The system according to claim 10, wherein the at least one arithmetic unit is further configured to:

collect individual single probability distributions of the plurality of observation vehicles; and merge the individual single probability distributions using the V2X communication among the plurality of observation vehicles.

12. The system according to claim 10, wherein the at least one arithmetic unit is further configured to transmit a prediction of a relevant maneuver, via the V2X communication, to further vehicles that are manually controlled.

* * * * *